(12) United States Patent
Miyake et al.

(10) Patent No.: US 8,809,746 B2
(45) Date of Patent: Aug. 19, 2014

(54) APPARATUS FOR PRODUCING TRICHLOROSILANE AND METHOD FOR PRODUCING TRICHLOROSILANE

(75) Inventors: Masami Miyake, Naka-gun (JP); Wataru Saiki, Hitachinaka (JP)

(73) Assignee: Mitsubishi Materials Corporation, Tokyo (JP)

( * ) Notice: Subject to any disclaimer, the term of this patent is extended or adjusted under 35 U.S.C. 154(b) by 420 days.

(21) Appl. No.: 12/932,816

(22) Filed: Mar. 3, 2011

(65) Prior Publication Data

US 2011/0215083 A1   Sep. 8, 2011

(30) Foreign Application Priority Data

Mar. 4, 2010   (JP) ................................ 2010-047958

(51) Int. Cl.
*F27D 11/00*   (2006.01)

(52) U.S. Cl.
USPC .......................................... 219/438; 392/485

(58) Field of Classification Search
USPC ................ 219/438; 392/485; 422/198, 199
See application file for complete search history.

(56) References Cited

U.S. PATENT DOCUMENTS

| | | | |
|---|---|---|---|
| 3,541,304 A | 11/1970 | Cohn | |
| 4,150,168 A | 4/1979 | Yatsurugi et al. | |
| 4,233,494 A | 11/1980 | Pawlik et al. | |
| 4,536,642 A | 8/1985 | Hamster et al. | |
| 5,906,799 A | 5/1999 | Burgie et al. | |
| 7,964,155 B2 * | 6/2011 | Ishii et al. | 422/198 |
| 8,034,300 B2 * | 10/2011 | Ishii | 422/199 |
| 8,282,902 B2 * | 10/2012 | Tebakari | 423/342 |
| 2004/0173597 A1 | 9/2004 | Agrawal et al. | |
| 2009/0155140 A1 * | 6/2009 | Ishii et al. | 422/198 |
| 2009/0169190 A1 | 7/2009 | Fang et al. | |
| 2009/0297708 A1 | 12/2009 | Tebakari | |
| 2010/0055007 A1 * | 3/2010 | Ishii | 422/199 |

FOREIGN PATENT DOCUMENTS

| | | | |
|---|---|---|---|
| EP | 1775263 A1 | 4/2007 | |
| EP | 2008969 A1 | 12/2008 | |
| JP | 53-106626 A | 9/1978 | |
| JP | 60-049021 A | 10/1985 | |
| JP | 62-123011 A | 6/1987 | |

(Continued)

OTHER PUBLICATIONS

European Search Report dated May 25, 2011, issued for the corresponding European patent application No. 11156868.9.

(Continued)

*Primary Examiner* — John Wasaff
(74) *Attorney, Agent, or Firm* — Edwards Wildman Palmer LLP (57) ABSTRACT

An apparatus for producing trichlorosilane, comprising: a reaction chamber into which the raw gas is introduced to produce a reaction gas; a plurality of heaters disposed inside the reaction chamber to heat the raw gas; and a plurality of electrodes connected to basal portions of the heaters, wherein the heaters include first heaters each having an exothermic portion and second heaters each having an exothermic portion shorter than that of the first heater and a radiation plate connected to the exothermic portion, wherein a partial portion of the exothermic portion of the first heater faces the radiation plate of the second heaters; the reaction chamber has an introducing port of the raw gas on a side of the exothermic portion of the second heater; and the reaction chamber has discharge port of the reaction product gas on a side of the radiation plate of the second heater is arranged.

6 Claims, 9 Drawing Sheets

(56) References Cited

FOREIGN PATENT DOCUMENTS

| | | |
|---|---|---|
| JP | 01-208312 A | 8/1989 |
| JP | 3781439 B2 | 10/1994 |
| JP | 2004-262753 A | 9/2004 |
| JP | 2007-003129 A | 1/2007 |
| JP | 2009-525937 A | 7/2009 |
| JP | 2009-536915 A | 10/2009 |
| JP | 2010-500274 A | 1/2010 |
| WO | WO-2007/091834 A1 | 8/2007 |
| WO | WO-2007/145474 A1 | 12/2007 |
| WO | WO-2008/018760 A1 | 2/2008 |

OTHER PUBLICATIONS

Office Action dated Dec. 3, 2013, issued for the Chinese patent application No. 201110049613.0 and English translation of Search Report.

Notice of Reasons for Rejection mailed Feb. 4, 2014, issued for the Japanese patent application No. 2011-045184 and English translation thereof.

* cited by examiner

APPARATUS FOR PRODUCING TRICHLOROSILANE AND METHOD FOR PRODUCING TRICHLOROSILANE

BACKGROUND OF THE INVENTION

1. Field of the Invention

The present invention relates to an apparatus for producing trichlorosilane and a method for producing trichlorosilane by converting silicon tetrachloride to trichlorosilane.

Priority is claimed on Japanese Patent Application No. 2010-047958 filed Mar. 4, 2010, the content of which is incorporated herein by reference.

2. Description of Related Art

Trichlorosilane ($SiHCl_3$) is used as a raw material for producing silicon (Si). The trichlorosilane can be produced by conversion of silicon tetrachloride ($SiCl_4$) through a reaction of silicon tetrachloride and hydrogen.

Silicon is produced by reductive reaction and thermolysis reaction of trichlorosilane shown by the below-described reaction formulae (1) and (2), and trichlorosilane is produced by the conversion reaction shown by the below-described reaction formula (3).

$$SiHCl_3 + H_2 \rightarrow Si + 3HCl \quad (1)$$

$$4SiHCl_3 \rightarrow Si + 3SiCl_4 + 2H_2 \quad (2)$$

$$SiCl_4 + H_2 \rightarrow SiHCl_3 HCl \quad (3)$$

For example, as an apparatus for producing trichlorosilane, Japanese Patent No. 3781439 and Japanese Unexamined Patent Application, First Publication, No. 2004-262753 propose a reaction vessel having a reaction chamber of dual structure constituted of outer chamber and inner chamber formed by two pipes of concentric alignment, and a heating element disposed to surround outer circumference of the reaction chamber. In this reaction vessel, reaction of a gas in the reaction chamber is caused by heating the interior of the reaction chamber from the outside by the heat generated by electrifying the heating element formed of carbon or the like.

Japanese Examined Patent Application, Second Publication No. S60-49021 discloses an apparatus in which a plurality of pipe-shaped heaters are disposed inside the reaction chamber, and a gas is directly heated in the reaction chamber and within the heaters.

A lower space of a reaction chamber tends to have low temperature. Japanese Unexamined Patent Application, First Publication No. 2007-3129 proposes a heater wherein a thickness of the heater is changed in the intermediate position to reduce a cross sectional area of a lower portion of the heater such that high temperature heat is generated in the lower portion of the heater thereby heating the lower space of the reaction chamber effectively.

In general, in an apparatus for producing trichlorosilane, carbon members coated with silicon carbide are used in reaction vessel and heaters so as to prevent generation of impurities at high temperature. In an apparatus for producing trichlorosilane, it is required to heat the interior of the reaction chamber to a reaction temperature of trichlorosilane at high heat efficiency. On the other hand, where the heater is heated to excessively high temperature, damage may be caused in the silicon carbide coating on the surface of the heater, resulting in exposure of carbon and generation of impurities from the carbon. Therefore, it is required to increase high temperature area of the surface of the heater while maintaining a maximum temperature of the surface of the heater to be not higher than an upper limit.

Where an apparatus has a structure as described in Japanese Patent No. 3781439 or in Japanese Unexamined Patent Application, First Publication No. 2004-262753, interior of the reaction chamber is heated by the heating element disposed outside the reaction chamber. In this case, heat from the heating element is radiated not only in the inner radial direction but also in the outer radial direction, resulting in a disadvantage of Although the heaters are disposed in the reaction chamber in the apparatus described in Japanese Examined Patent Application, Second Publication No. S60-49021, the constitution of the apparatus is not efficient since the gas passes through narrow pipes.

In the heater described in Japanese Unexamined Patent Application, First Publication No. 2007-3129, power density of the lower portion of the heater is increased by making the cross-sectional area of the lower portion of the heater to be smaller than the cross-sectional area of the upper portion of the heater. However, upper portion of the heater must have remarkably large size so as to decrease power density of the upper portion largely while having the heater stand stably by ensuring sufficient cross sectional area for the lower portion of the heater. In this constitution, there is a possibility of restriction of numbers and/or arrangement of the heaters when a plurality of heaters are disposed in a reaction chamber.

Based on the consideration of the above-described problems, an object of the present invention is to provide an apparatus for producing trichlorosilane and a method for producing trichlorosilane that enable heating of raw gas at improved high heat efficiency while controlling the maximum temperature of the surface of the heater in the reaction chamber.

SUMMARY OF THE INVENTION

A first aspect of the present invention is an apparatus for producing trichlorosilane from a raw gas (raw material gas, source gas) that includes silicon tetrachloride and hydrogen, including: a reaction chamber into which the raw gas is introduced to produce a reaction product gas containing trichlorosilane, hydrogen chloride or the like; a plurality of heaters that are disposed inside the reaction chamber to heat the raw gas and that is elongated in the vertical direction; and a plurality of electrodes connected to basal portions of the heaters, wherein the heaters include first heaters (first type heaters) each constituted of an exothermic portion that generates heat by electrification through the electrodes; and second heaters (second type heaters) each having a exothermic portion that is shorter than that of the first heater and generates heat by electrification through the electrodes, and a radiation plate that is constituted of a non-exothermic portion and is connected to an upper end or a lower end of the exothermic portion, wherein the first heaters and the second heaters are disposed such that a partial portion of the exothermic portion of the first heater faces the radiation plate of the second heater; the reaction chamber has an introducing port of the raw gas on a side to which the exothermic portion of the second heater is arranged; and the reaction chamber has a discharge port of the reaction gas on a side to which the radiation plates of the second heaters are arranged.

Since the heaters are arranged inside the reaction chamber in the above-described apparatus for producing trichlorosilane, heat of the heaters is transferred directly to the raw gas passing the space around the heaters. Therefore, it is possible to heat the raw gas at high heat efficiency. Since the heaters are disposed inside the reaction chamber, it is possible to provide the heaters to appropriate positions even when the reaction chamber has a large size. Therefore, reduction of heat efficiency can be avoided.

In addition to the first heaters, second heaters having a radiation plate are disposed in the above-described apparatus for producing trichrolosilane such that each of the second heater faces the first heater. The radiation plates of the second heaters are arranged on a side of a discharge port through which the reaction product gas in the reaction chamber is discharged. Therefore, it is possible to increase the temperature of the raw gas rapidly and heat the raw gas efficiently while maintaining the high heat value (calorific value) in the exothermic portions of the first heater and the second heater exposed to the raw gas of low temperature in the reaction chamber.

In this case, since the radiation plate of the second heater faces the first heater, the radiation plate is heated by the heat of the first heater and radiate the heat to surroundings. As a result, the radiation plate heat its surrounding while suppressing elevation of the surface temperature of the portion of the first heater facing the radiation plate. An exothermic portion has a maximum temperature on the side of discharge port of reaction gas. By the thus replacing a partial portion of the exothermic portion on the side of discharge port by the radiation plate constituted of non-exothermic portion in partial numbers of heaters, it is possible to suppress the elevation of the maximum surface temperature of the heater while increasing the high temperature areas of the surfaces of the heaters and the radiation plate. As a result, it is possible to heat the interior of the reaction chamber effectively. Here, the non-exothermic portion denotes a portion, where amount of heat generated by resistance heating is remarkably lower than the amount of heat generated in the exothermic portion.

In the above-described apparatus for producing trichlorosilane, the radiation plate may be formed to have a length (vertical dimension, vertical measure) of ⅔ to ¼ of a length of the exothermic portion of the first heater.

Where the length of the radiation plate exceeds ⅔ of the length of the exothermic portion of the first heater, length of the exothermic portion of the second heater is suppressed to an excessively small value, resulting in inferior efficiency as a heater. Where the length of the radiation plate is smaller than ¼ of the length of the exothermic portion of the first heater, like as the reaction chamber in which only the first heaters are disposed, surface temperatures of the first heater and the second heater tend to increase in the portions on the side of the discharge port, resulting in requirement for decreasing electric power supply to the heaters so as to suppress the excessively high temperature of the heater surface.

In the above-described apparatus for producing trichlorosilane, arrangement of the plurality of heaters may be constituted such that the heaters are arranged along a pluralities of first-type heater lines and at least one second type heater line positioned between the first-type lines, where the heaters arrayed along the first-type heater lines are constituted only of the first heaters, and all or a part of the heaters arranged along each of the second-type heater lines are constituted of the second heaters.

Temperature of each first heaters is elevated to high temperature at the portion on the side of the discharge port for the reaction product gas. By disposing the second heater such that the radiation plate of the second heater face the exothermic portion of the first heater, it is possible to suppress elevation of the maximum temperature of the heater surface.

To achieve the above-described effect in the above-described apparatus for producing trichlorosilane, it is preferable that the plurality of heaters are arranged along three of more concentric circular lines, and at least one circular line other than the outer most circular line and the inner most circular line is constituted of the second-type heater line.

By disposing the heaters such that the radiation plate of the second heater is interposed between each pair of the first heaters, the radiation plate exposed to the radiation from the first heaters on the both sides can heat the interior of the reaction chamber effectively. By controlling the numbers and disposed positions of the second heaters, and proportions of the lengths of the radiation plates to the lengths of the exothermic portions appropriately, it is possible to control the thermal distribution in the interior of the reaction chamber.

The above-described apparatus for producing trichlorosilane may be constituted such that a supply port through which the raw gas is introduced into the reaction chamber is disposed in a lower section or a bottom section of the reaction chamber, basal portions of the heaters at which the heaters and the electrodes are connected are disposed in a lower space in the reaction chamber, the radiation plates of the second heaters are disposed in an upper space in the reaction chamber, and the discharge port through which the reaction product gas is discharged to outside from the reaction chamber are disposed in an upper section of the reaction chamber.

When a vicinity of a joint between the electrode and the heater disposed in the reaction chamber is exposed to the raw gas at high temperature, there is a possibility of generation of impurities from the electrode. Where the supply port of the raw gas is disposed in the lower section or the bottom section of the reaction chamber and the joints between the heaters and the electrodes are disposed in a lower space in the reaction chamber, it is possible to make the joints be in contact with the raw gas of relatively low temperature state introduced from the gas introducing port. By this constitution, it is possible to suppress elevation of the temperature of the joints, thereby preventing the generation of impurities, and making it easy to design a cooling mechanism in the joint.

A second aspect of the present invention is a method for producing trichlorosilane, including: supplying a raw gas containing silicon tetrachloride and hydrogen into a reaction chamber; generating heat by electrifying a pluralities of heaters vertically standing in the reaction chamber; and thereby producing trichlorosilane, wherein the pluralities of heaters are constituted of first heaters each of which is constituted of an exothermic portion that generates heat by electrification through electrodes provided to basal portions thereof; and second heaters each of which has a exothermic portion that is shorter than that of the first heater and generates heat by electrification through electrodes, and a radiation plate that is made of a non-exothermic portion and is connected to an upper end or a lower end of the exothermic portion, wherein the heaters are disposed such that a partial portion of the exothermic portion of the first heater faces the radiation plate of the second heater; the raw gas is supplied into the reaction chamber at a side to which the exothermic portions of the second heaters are arranged; and the reaction product gas containing trichlorosilane is discharged from a side to which the radiation plates of the second heaters are arranged.

According to the present invention, since the heaters are disposed inside the reaction chamber, it is possible to transfer the heat of the heater directly to the raw gas, thereby heating the raw gas at high heat efficiency, and improving the rate of conversion of silicon tetrachloride to trichlorosilane. Further, the heaters are constituted such that a large amount of heat is generated at a side of gas introducing port, thereby rapidly heating the raw gas after its introduction into the chamber, relatively small amount of heat is generated at a side of the gas discharge port where the radiation plates are disposed, and the surroundings of the heaters at this side is heated by the radiation plates. In this constitution, it is possible to achieve high heat efficiency by increasing the high temperature region of the surfaces of the heaters and radiation plates while suppressing the excessively high temperature of the surfaces of the heaters in the reaction chamber.

DETAILED DESCRIPTION OF THE INVENTION

In the following, an embodiment of an apparatus for producing trichlorosilane according to the present invention is explained.

Figure 1:
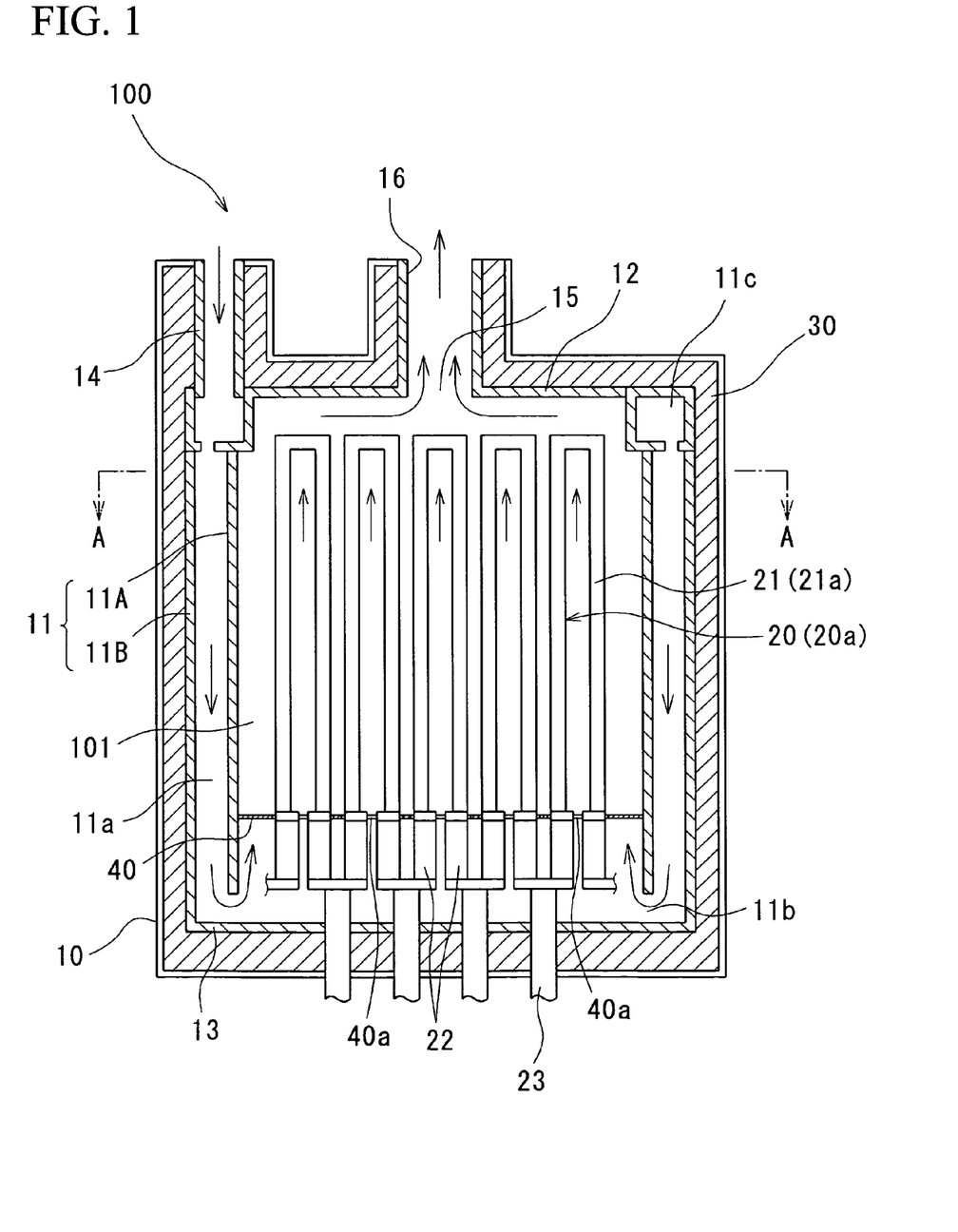
FIG. 1 is a vertical cross-sectional view schematically showing an embodiment of an apparatus for producing trichlorosilane according to the present invention.
Figure 2:
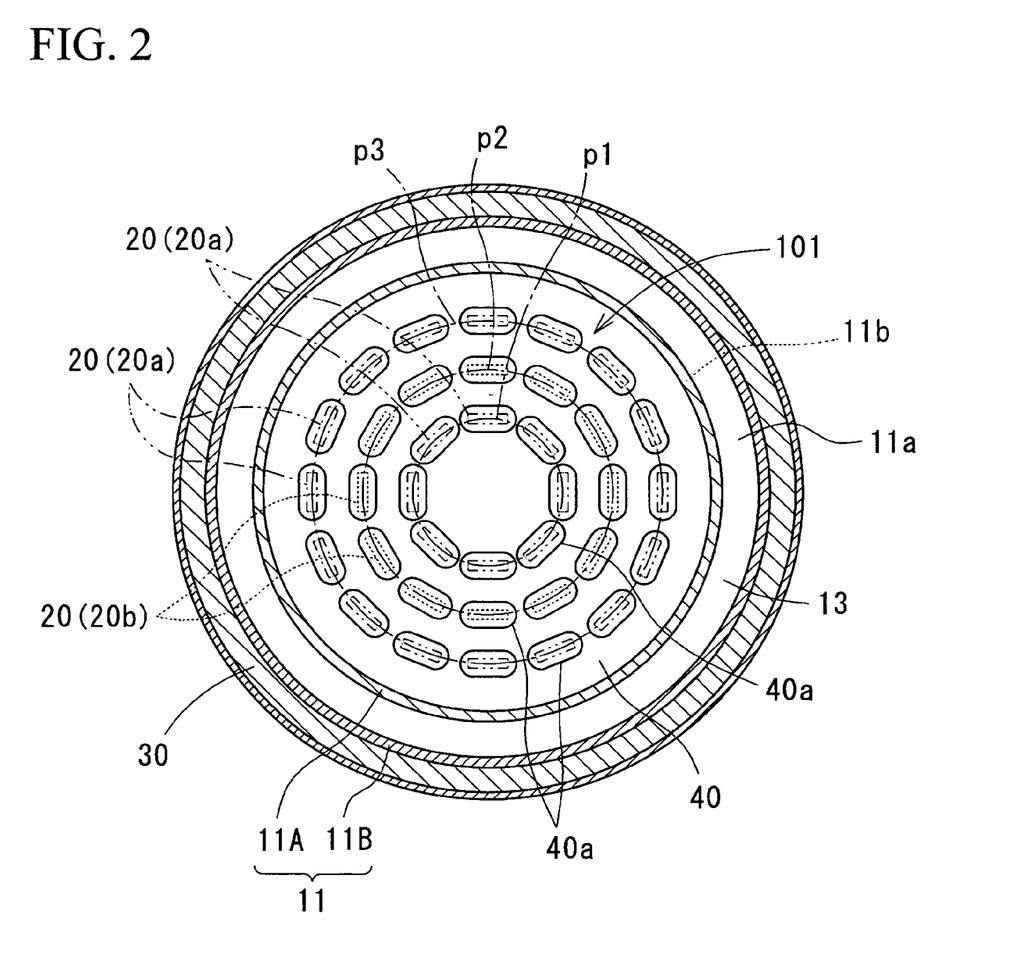
FIG. 2 is a horizontal cross-sectional view of the apparatus shown in FIG. 1, sectioned at a level shown by the line A-A.

An apparatus for producing trichlorosilane 100 according to the present embodiment is an apparatus that heats a raw gas containing silicon tetrachloride and hydrogen and generates a reaction product gas containing trichlorosilane and hydrogen chloride through conversion reaction of the raw gas, thereby producing trichlorosilane. As shown in FIG. 1 and FIG. 2, the apparatus 100 includes a reaction vessel 10 into which the raw gas is supplied, a pluralities of heaters 20 that are disposed in the reaction vessel 10 and heat the raw gas, and a pluralities of electrodes 23 that are connected to bottom end of the heaters 20. The reaction vessel 10 includes a heat insulating container 30 to prevent reduction of heat efficiency by dissipation of heat of the heater 20 from the reaction vessel 10.

The reaction vessel 10 comprises a substantially cylindrical wall body 11, a top plate 12 that covers an upper opening formed by the wall body 11, and a bottom plate 13 that closes a lower opening formed by the wall body 11.

The wall body includes a inner wall 11A and a outer wall 11B each having a substantially cylindrical shape. The inner wall 11A and the outer wall 11B are disposed concentrically, forming a cylindrical space (cylindrical passage 11a) between the inner wall 11A and the outer wall 11B. Lower edge of the outer wall 11B is joined to the bottom plate 13 and sealed by the bottom plate 13. On the other hand, the inner wall 11A is disposed such that a lower edge of the inner wall 11A is joined to the bottom plate 13, but a part of a peripheral portion of the bottom plate 13 is apart from the inner wall 11A forming gas introducing ports 11b. The gas introducing ports 11b are arranged at regular intervals such that a drift current of gas does not occur in the reaction chamber, and communicate the cylindrical passage 11a and a space inside the inner wall 11A.

A ring shaped passage 11c connected to the upper part of the cylindrical passage 11a is disposed in the wall body 11. A raw gas supply pipe 14 is connected to an upper part of the ring shaped passage 11c. A gas discharge port 15 through which the reaction product gas is discharged outside the apparatus is disposed such that a center of the top plate 12 that seals the upper edge of the wall body 11 is penetrated by the gas discharge port 15. A discharge pipe 16 that elongates upward above the reaction chamber 101 is provided to the gas discharge port 15.

Bottom plate 13 of the reaction vessel 10 is joined to the lower edge of the outer wall 11B and seals the lower edge of the wall body 11. A plurality of heaters 20 are arranged along a plurality of concentric circles.

The top plate 12 of the reaction vessel 10 is joined to the inner wall 11A and outer wall 11B of the wall body 11 and blocks off the upper end (circular end) of the wall body 11. A plurality of heaters 20 stands in a space that is surrounded by the top plate 12, the wall body 11 (inner wall 11A), and the bottom plate 13. This space constitutes a reaction chamber 101 of the apparatus for producing trichlorosilane 100.

Each of the plurality of heaters 20 that heats the raw gas inside the reaction chamber 101 is fixed to a pair of electrodes 23. The heaters 20 are constituted of first heaters 20a and second heaters 20b each having a platy exothermic portion that is connected to the electrodes and generates heat by resistance heating by electric current. Each heater 20 is formed of carbon, and surfaces of the electrodes 23 and the heaters 20 are coated with silicon carbide.

Heaters 20 adjacent to each other are connected electrically via each electrode 23. By this constitution, a plurality of heaters (for example, four heaters) are connected serially. A plurality of groups of the serially connected heaters 20 are connected in parallel, and electric power is supplied to the heaters 20. As a result, heat is generated in each of exothermic portions 21. Thus, the raw gas inside the reaction chamber 101 can be heated.

Figure 3:
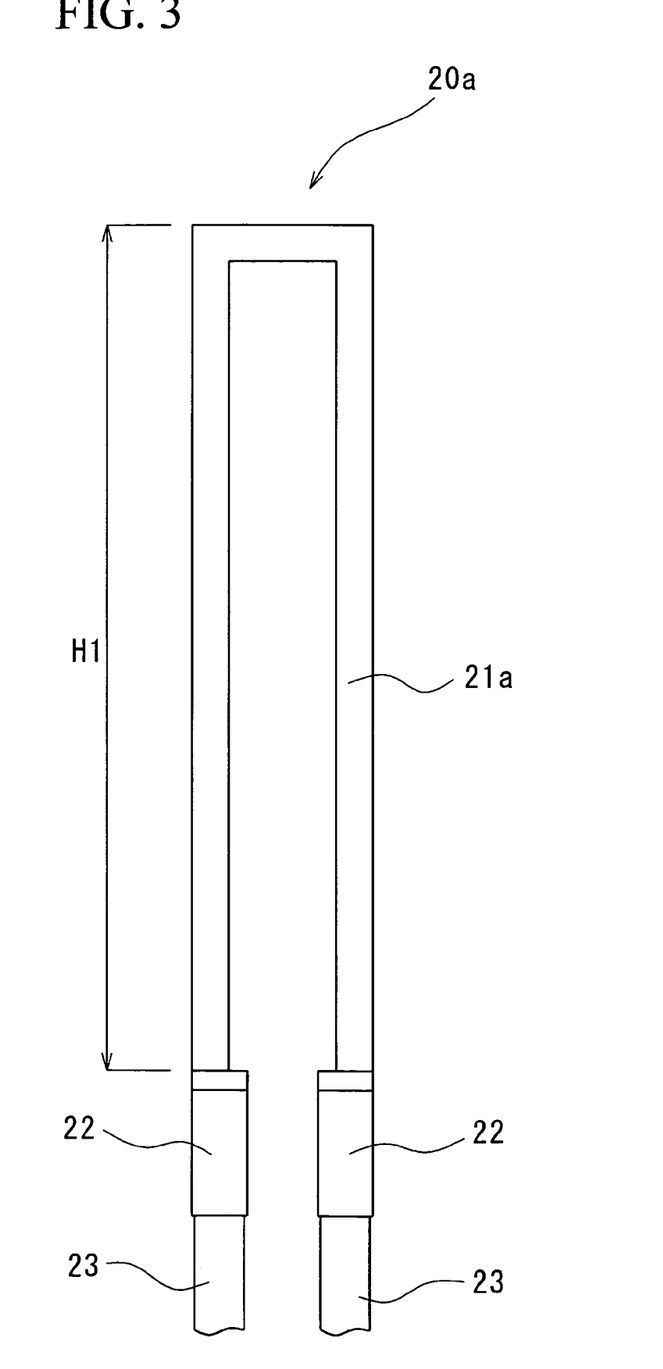
FIG. 3 is a side view of a first heater in an apparatus for producing trichlorosilane according to the present invention.

As shown in FIG. 3, except for a basal portion 22 where the exothermic portion 21a is connected to electrodes 23, main portion of the exothermic portion 21a of the first heater is constituted to have a reversal U-shaped platy shape.

Figure 4:
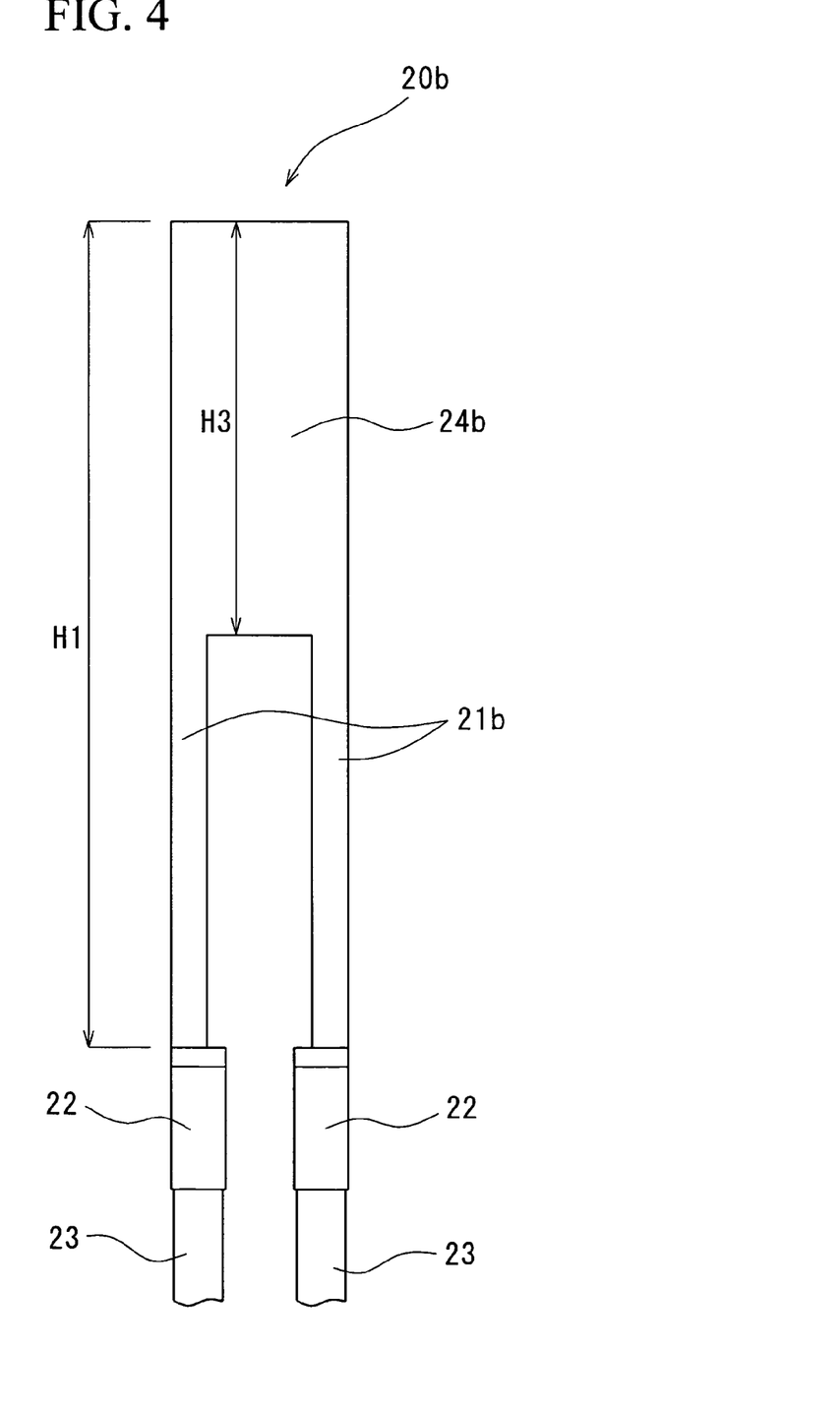
FIG. 4 is a side view of an second heater in an apparatus for producing trichlorosilane according to the present invention.

As shown in FIG. 4, exothermic portion 21b of the second heater 20b is formed shorter than the exothermic portion 21a of the first heater 20a. A radiation plate 24b made of a non-exothermic portion is joined to the upper end of the exothermic portion 21b. The radiation plate 24b is formed to have a platy shape that has the same thickness as the thickness of the exothermic portion 21b, but has a larger width compared to the width of the exothermic portion. Since the cross-sectional area of the radiation plate 24b is sufficiently larger than the exothermic portion 21b, the radiation plate 24b constitutes a non-exothermic portion. The length (H3 shown in FIG. 4) of the radiation plate 24b is within a range from ¼ to ⅔ of the total height H1 of the exothermic portion 21a of the first heater 20a, where a dimension of the basal portion 22 is excluded from the total height H1.

As shown in FIG. 2, the first heaters 20a and the second heaters 20b are arranged in the reaction chamber 101 along triple concentric circles. Both of the heater line p1 (group p1) along the innermost circle and heater line p3 along the outermost circle are constituted only of the first heaters 20a, and heater line p2 interposed between the heater line p1 and the heater line p3 is constituted only of the second heaters 20b.

This arrangement of heaters is constituted such that exothermic portions of the first heaters 20a and exothermic portions of the second heaters 20b generate heat by resistance heating in the lower section (lower space) of the reaction chamber 101, and only the exothermic portions 21a of the first heaters generate heat in the upper section of the reaction chamber 101. Therefore, large amount of heat is generated in the lower section where the exothermic portions 21a and 21b are provided, and the amount of heat generated in the upper section (where only the exothermic portions 21a are provided) is smaller than the amount of heat generated in the lower section. Since the second heaters 20b are interposed between the first heaters 20a, exothermic portions 21a of the first heaters 20a face the radiation plates 24 of the second heaters 20b. The radiation plates 24 absorbs heat from the exothermic portion 21a and suppress temperature elevation in the exothermic portion 21a. Surroundings of the radiation plate 24 is heated by the radiation plate 24 that is heated to high temperature by absorbing heat from the exothermic portion 21a heat. Thus, it is possible to increase high temperature area (high surface temperature area) of the surfaces of the first heaters 20a and the second heaters 20b in the reaction chamber 101 while suppressing excessively-high temperature of the surfaces of the first heaters 20a and the second heaters 20b.

A dispersing plate 40 is disposed at a level of the upper end of the basal portions 22 of the heaters 20 such that the dispersing plate 40 is arranged above the level of the gas introducing port 11b. The dispersing plate 40 is disposed substantially horizontally. The dispersing plates 40 has gas communicating holes 40a, where a shape of each of the gas communicating holes 40 depends on the arrangement of each heater 20 in the reaction chamber 101. The reaction chamber 101 is separated to the lower section and the upper section by the thus arranged dispersing plates 40, where the lower section houses the basal portions 22 that constitute junctions between the heaters 20 and the electrodes 23, the upper section houses the exothermic portions 21 of the heaters 20, and the raw gas is introduced into the lower section and is heated in the upper section.

In the apparatus for producing trichlorosilane 100 of the above-described constitution, the raw gas supplied to the reaction vessel 10 through the raw gas supply pipe 14 is filled in the ring-shaped passage 11c, and is subsequently introduced into the cylindrical passage 11a. The raw gas in the cylindrical passage 11a is introduced into the lower section of the inner space of the reaction chamber 101 through the gas introducing port 11b.

Temperature of the raw gas introduced into the reaction chamber 101 is, for example, 400° C. to 700° C. The raw gas is firstly filled in the space below the dispersing plate that disturb gas flow, and is supplied dispersively to the space above the dispersing plate through the dispersing passages 40a, and then, heated by the heaters 20.

Since the amount of exothermic heat from the lower portions of the first heaters 20a and the second heaters 20b are increased by the heat generated in the exothermic portions 21a and 21b, the supplied raw gas at relatively low temperature state can be heated rapidly in the early stage of the raw gas introduction through the dispersing plates 40. The raw gas heated in the lower section of the reaction chamber 101 flows upward in the reaction chamber 101 and is further heated by the exothermic portions 21a of the first heaters 20a. In addition, the raw gas is also heated by the radiation plates 24 of the second heaters 20b, since the radiation plates 24b face the exothermic portions 21a and are heated by absorbing the heat from the exothermic portion 21a. Therefore, even though the amount of heat generated in the upper section of the reaction chamber 101 is smaller than that generated in the lower section of the reaction chamber 101, it is possible to heat the raw gas effectively by the effect of the radiation plates 24b. In addition, it is possible to increase the high temperature areas of the surfaces of the first heaters 20a and the second heaters 20b in the reaction chamber 101 while suppressing excessively-high temperature of the surface of the first heaters 20a and the second heaters 20b.

The reaction product gas generated by conversion reaction of the raw gas heated by the first heaters 20a and the second heaters 20b is at a temperature of, for example, 800° C. to 1000° C. The reaction product gas is discharged from the apparatus for producing trichlorosilane 100 through the gas discharging port 15.

As explained above, according to the above-described apparatus for producing trichlorosilane 100, a plurality of heaters 20 are disposed inside the reaction chamber 101. Therefore, heat of the heater 20 is directly transferred to the raw gas flowing around the heaters 20. As a result, it is possible to heat the raw gas at high heat efficiency. In addition, in the lower section of the reaction chamber 101, large amount of heat is generated by the exothermic portions 21a of the first heaters 20a and the exothermic portions 21b of the second heaters 20b. In the upper section of the reaction chamber 101, while avoiding elevation of maximum temperature of the surfaces of the first heaters 20a, high temperature areas of the surfaces of the heaters are increased by the heat from the exothermic portions 21a of the first heaters 20a and by the heat radiated from the radiation plate 24b of the second heaters 20b. Therefore, it is possible to heat the interior space of the reaction chamber 101 effectively.

That is, according to the above-described apparatus for producing trichlorosilane 100, it is possible to achieve sufficient heat output from the exothermic portions 21 in the lower section of the reaction chamber 101 into which the raw gas is supplied while avoiding excessively high temperature state of the surfaces of the heaters in the upper section of the reaction chamber 101. Therefore, it is possible to heat the raw gas effectively.

Since the electrodes 23 are disposed inside reaction chamber 101, vicinities of the basal portions 22 constituting the junctions between the electrodes 23 and the heaters 20 are exposed to the raw gas. Therefore, there is a possibility of generation of impurities from the basal portions 22. However, since the gas introducing port 11b is disposed in the lower section of the reaction chamber 101, it is possible to make the raw gas at relatively low temperature state contact the basal portions 22. By this constitution, it is possible to suppress elevation of temperature of the basal portions 22, thereby suppressing generation of impurities, and facilitating cooling.

EXAMPLES

Next, examples according to the apparatus for producing trichlorosilane of the present invention are explained. In each of the apparatus for producing trichlorosilane used in the Examples, three lines of heaters were arranged constituting triple concentric circles. In Examples 1 to 4, first heaters 20a were arranged on the innermost heater line p1 and outermost heater line p3, and second heaters 20b were disposed on the heater line p2. As shown in FIG. 3, each of the first heaters 20a were constituted of exothermic portion 21a from the junction to the electrode to the upper end. As shown in FIG. 4 to FIG. 7, each of the second heaters 20b had a radiation plate 24b joined to the upper end of the exothermic portion 21b. The height of the radiation plate 24b was different among Examples 1 to 4.

In Examples 1 to 3, main portions except for the basal portions of the first heater 20a and the second heater 20 b had the same height H1, whereas the height H3 of the radiation plate 24b of the second heater 20b was different among different Examples as shown in Table 1.

Proportions of the height H3 of the radiation plates 24b to the total height H1 of the second heaters 20b, and proportions of the electric current electrified in each of the heater lines were controlled to be the values as shown in Table 1.

Figure 5:
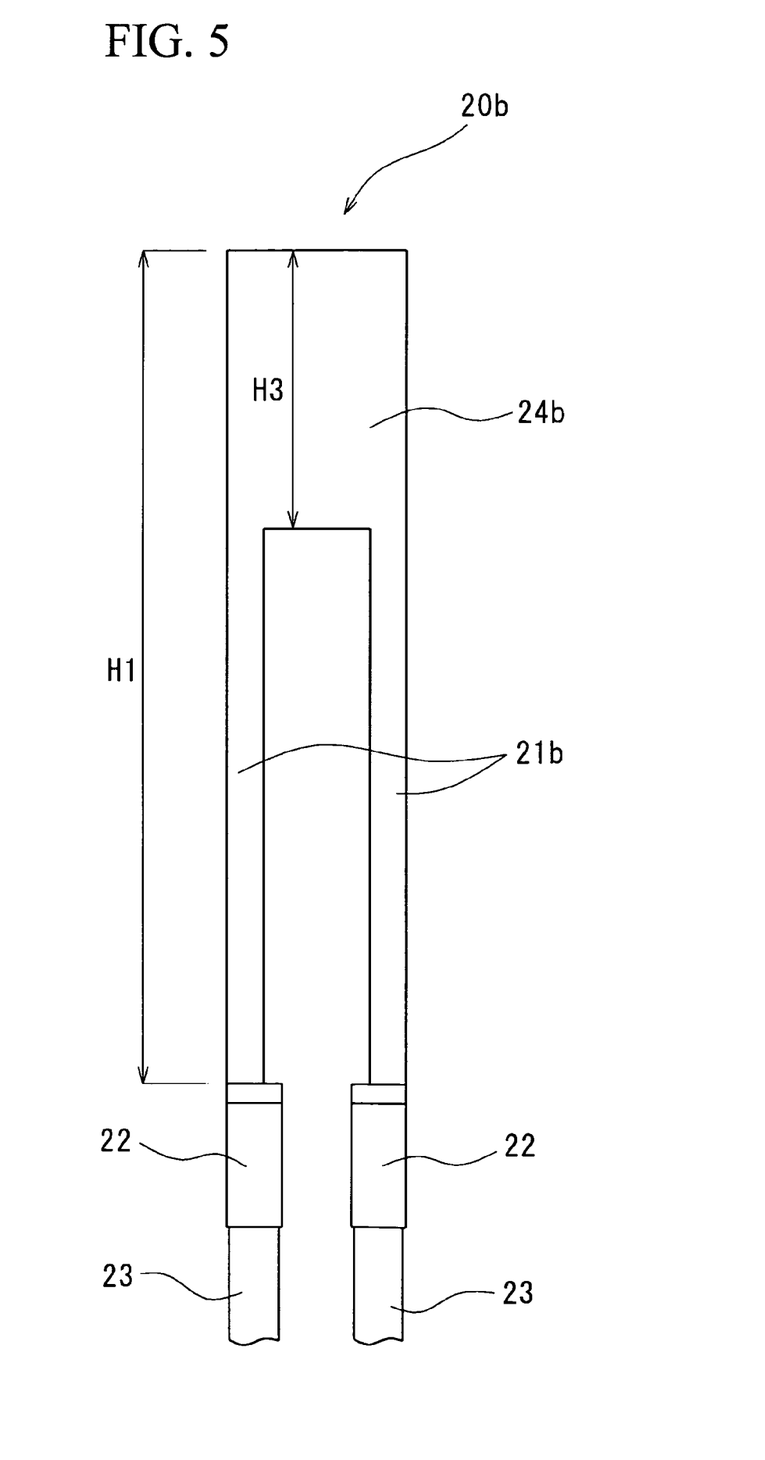
FIG. 5 is a side view showing a second heater of Example 2.
Figure 6:
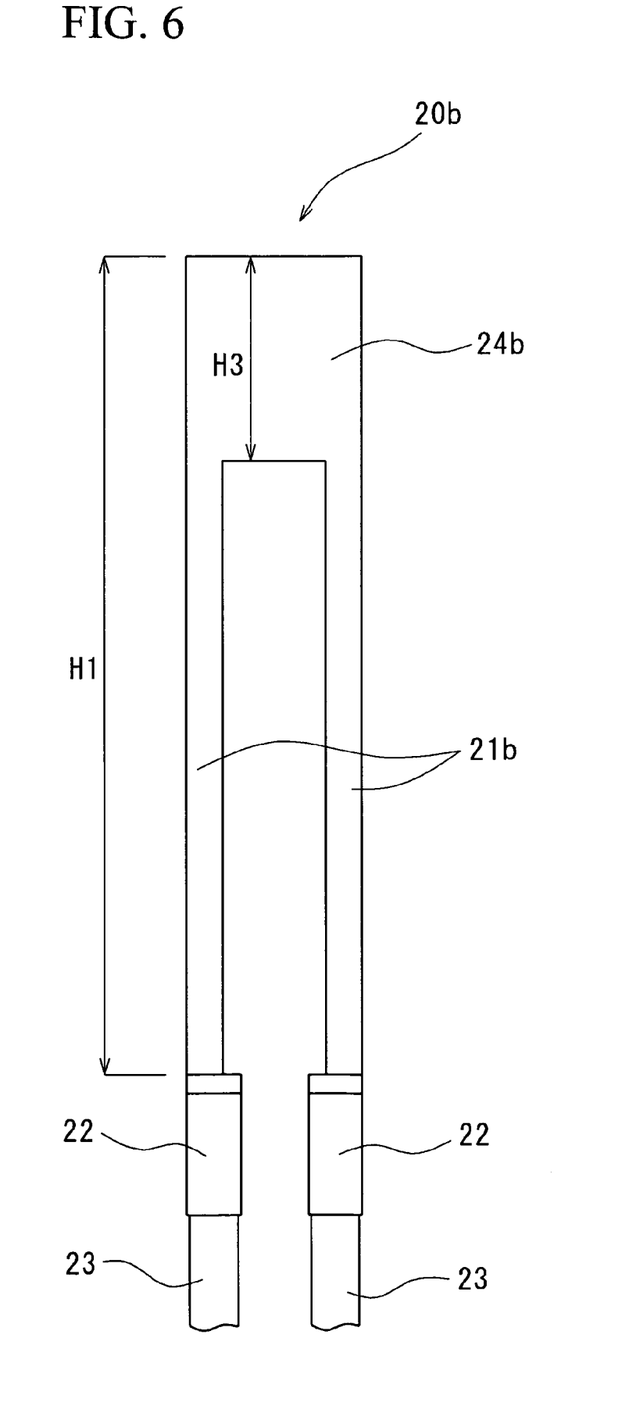
FIG. 6 is a side view showing a second heater of Example 3.

Proportion of the height H3 to H1 was described as a percentage ratio compared to 100% which denoted the total height H1 of the heaters in Examples 1 to 3. FIG. 4 shows a second heater 20b used in Example 1. FIG. 5 shows a second heater 20b used in Example 2. FIG. 6 shows a second heater 20b used in Example 3. As shown in Table 1, radiation plates 24b of the second heaters 20b were respectively formed to have a height H3 of 50%, 33%, and 25% of H1 in Examples 1, 2, and 3.

Figure 7:
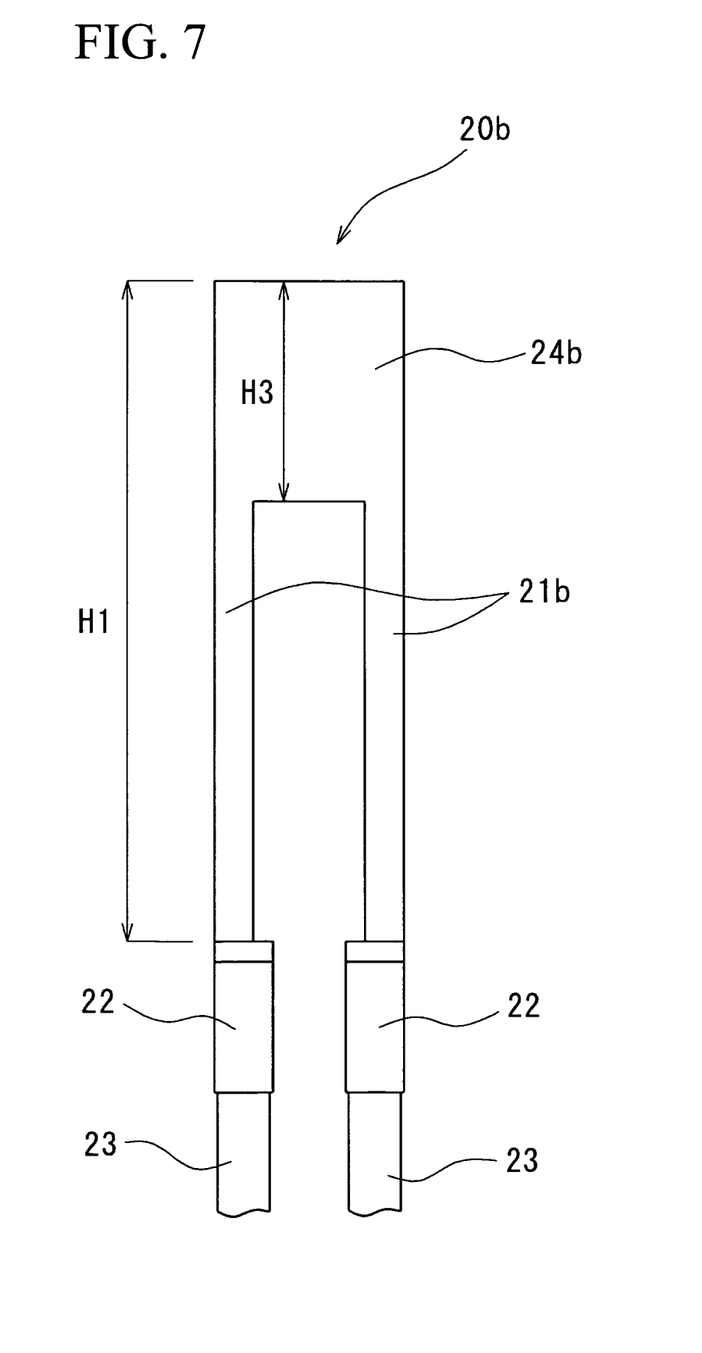
FIG. 7 is a side view showing a third heater of Example 4.

In Example 4, as shown in FIG. 7, the height H1 to the upper end of the second heater 20b, that is, the total height excluding the height of the basal portion of the heater, was formed to be 75% of the height of the second heaters 20b in Examples 1 to 3, and the height H3 of the radiation plate 24b was 25% as like as Example 3.

In Comparative Example 5, the first heaters 20a which did not have the radiation plates were arranged in heater line p2, as well as in heater line p1 and heater line p3. That is, all the heaters inside the reaction chamber of the apparatus for producing trichlorosilane were constituted of the first heaters.

Figure 8:
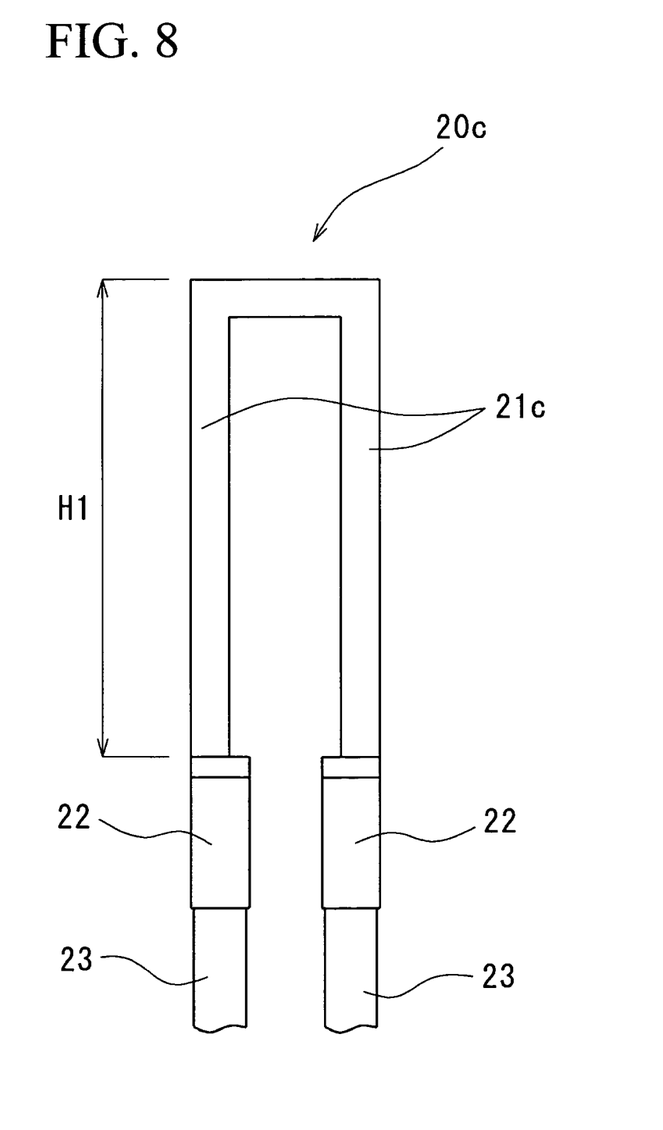
FIG. 8 is a side view showing a fourth heater of Comparative Example 6.

In Comparative Example 6, the apparatus for producing trichlorosilane was constituted such that first heaters 20a were arranged in heater line p1 and heater line p3, and third type heaters 20c shown in FIG. 8 were arranged in heater line p2. Each of the third type heaters 20c was not disposed with the radiation plate, and total height H1 (height of the exothermic portion 21c) of the heater excluding the height of the basal portion was formed to be 50% of the height H1 of the first heater 20a.

In Table 1, "Height ratio of radiation plate" with respect to Examples 1 to 4 denotes the proportion H3/H1 where H1 is a total height (except for the height of the basal portion) of the heaters 20a, 20b, and H3 denotes a height of radiation plate 24b. "Proportion of current (%)" denotes proportions of electric currents electrified in each of the heater lines p1, p2, and p3 which are connected in parallel, where the proportion is described by a percentage ratio of a total current (100%) electrified in lines p1 to p3. "Conversion ratio (%)" denotes a conversion ratio to trichlorosilane from the raw gas. "Maximum temperature (° C.)" denotes the maximum temperature of the surface of the exothermic portion 21a of the heater 20a.

"Area at a temperature ≧950° C. (%)" denotes a ratio of area at a temperature of not lower than 950° C. on the surface of the exothermic portion 21a of the heater 20a, and corresponds to a proportion of the length of the area from the upper end of the exothermic portion to the total length of the exothermic portion. "Efficiency" denotes a value given by conversion ratio divided by the total output from the heater, where the value for Comparative Example 5 is defined to be 1, and the value for each of Examples 1 to 4 and Comparative Example 6 is shown by a ratio normalized by the value for the Comparative Example 5.

In Comparative Example 5 and Comparative Example 6, all the heaters were constituted of the first heaters 20a or the third type heaters 20c which did not have a radiation plate. Therefore, the "Height ratio of radiation plate" is shown by "-".

Proportion of trichlorosilane and hydrogen in the raw gas was 1:2, and the raw gas was heated to 500° C. and was supplied to the reaction chamber from the side of the lower section of the reaction chamber.

TABLE 1

| | Height H1 (%) | Height H3 (%) | Height ratio of radiation plate | Proportion of current (%) | | | Temperature of gas at discharge port (° C.) | Conversion ratio (%) | Surface temperature of heater | | Efficiency |
| | | | | p1 | p2 | p3 | | | Maximum temperature (° C.) | Area at a temperature ≧950° C. (%) | |
|---|---|---|---|---|---|---|---|---|---|---|---|
| 1 | 100 | 50 | 1/2 | 28.5 | 35.0 | 36.5 | 789 | 13.2 | 1100 | 90 | 1.05 |
| 2 | 100 | 33 | 1/3 | 30.5 | 32.5 | 37.0 | 778 | 12.7 | 1100 | 85 | 1.07 |
| 3 | 100 | 25 | 1/4 | 32.0 | 32.0 | 36.0 | 780 | 12.8 | 1100 | 88 | 1.05 |
| 4 | 75 | 25 | 1/3 | 26.0 | 33.0 | 41.0 | 778 | 12.7 | 1100 | 85 | 1.00 |
| 5 | 100 | — | — | 25.0 | 35.0 | 40.0 | 778 | 12.7 | 1100 | 80 | 1.00 |
| 6 | 50 | — | — | 26.0 | 32.0 | 42.0 | 767 | 12.1 | 1100 | 81 | 0.91 |

As it is obvious from Table 1, area of the heater having a surface temperature of 950° C. or more was increased by 5 to 10%, and conversion ratio relative to the total output of the heater was increased by 5 to 7% in Examples 1 to 3. Thus, it was confirmed that high temperature area on the surface of the heater was increased while avoiding elevation of maximum surface temperature of the heater, and conversion ratio to trichlorosilane versus total output from the heaters was increased by disposing radiation plate.

In Example 4, where a radiation plate was disposed in the second heater 20b of decreased total height H1, area of the heater having a surface temperature of 950° C. was increased by 5%, and conversion ratio to trichlorosilane versus total output from the heaters was not reduced.

The present invention is not limited to the above-described embodiment. Constitutions of the apparatus and the method may be modified variously within the scope of the present invention.

In the above-describe embodiment, the heater line p2 constituted of the second heaters 20b having a radiation plate was interposed between the heater lines p1 and p3 constituted of the first heaters 20a. However, it is not necessary to constitute the heater line p2 only of the second heaters 20b. The second heaters 20b may be disposed in partial positions in the heater line p2, and the rest of the heaters of the heater line p2 may be constituted of the first heaters 20a. Thermal distribution in the reaction chamber and thermal distribution of the surfaces of the heaters may be controlled by controlling the numbers and arranged positions of the second heaters 20b, and proportion of the length of the radiation plate 24b and exothermic portion 21b.

In the above-described embodiment, electrodes 23 connected to the heaters 20 were disposed in the lower section of the reaction chamber 101, and raw gas was supplied to the lower section of the reaction chamber 101. Alternatively, the electrodes may be disposed in upper section of the reaction chamber, and the raw gas may be supplied to the upper section of the reaction chamber. In this case, the first heaters and the second heaters may be constituted to have an exothermic portion that elongates towards lower direction, the radiation plates may be disposed below the exothermic portions of the second heaters, and the reaction product gas may be discharged from the lower section of the reaction chamber. By this constitution, it is possible to achieve a similar effect as the above-described embodiment.

Figure 9:
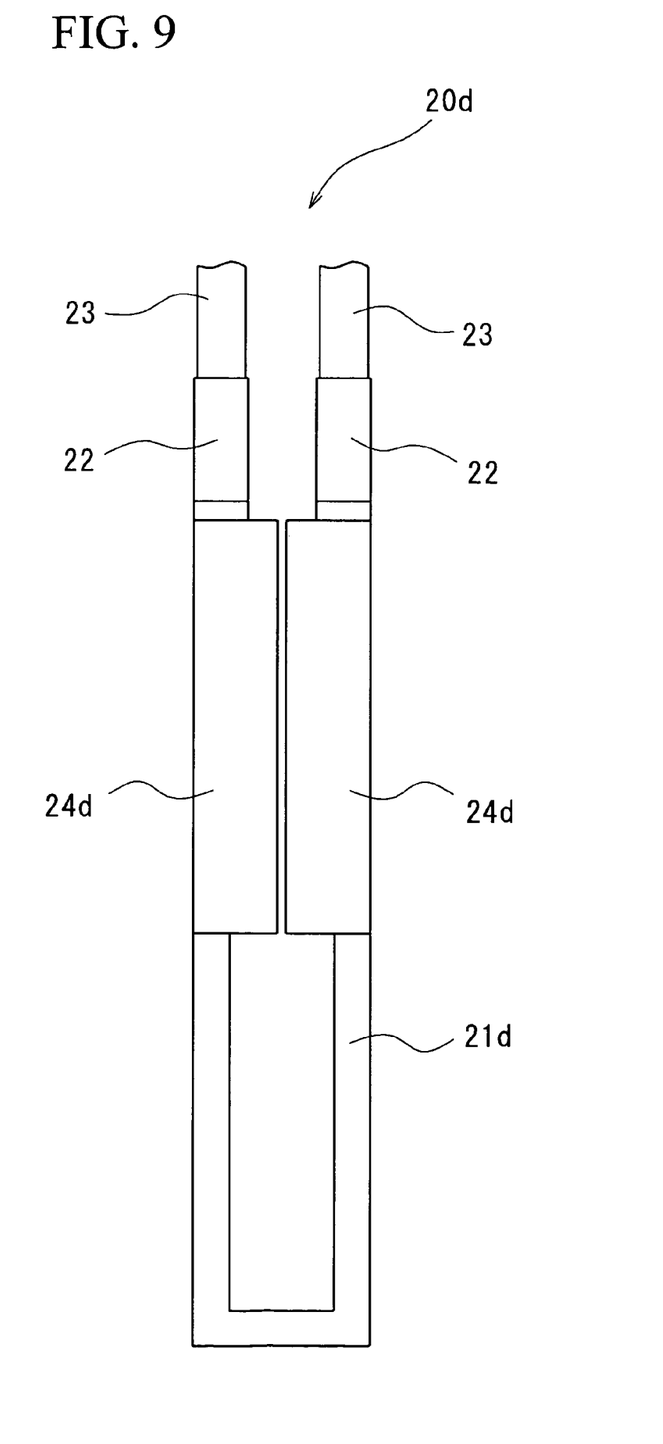
FIG. 9 is a side view of a second heater in another embodiment according to the present invention.

As shown in FIG. 9, the radiation plate 24d may be disposed in the basal portion, and the exothermic portion 21d may be provided to the lower end of the radiation plate 24d. In this case, the radiation plate 24d has a constitution of a pair of plates separated from each other.

In the above-described embodiment shown in FIG. 1, the discharge pipe 16 was provided to the gas discharge port 15 on the upper section of the reaction chamber 101 such that the discharge pipe 16 elongated upward on the reaction chamber 101. Alternatively, top plate of the reaction chamber may set at a closed state, and the discharge pipe may be disposed to be elongated from the discharge port on the upper section of the reaction chamber towards the lower direction via the central portion of the reaction chamber 101 and penetrate the bottom plate.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An apparatus for producing trichlorosilane from a raw gas that includes silicon tetrachloride and hydrogen, comprising:
   a reaction chamber into which the raw gas is introduced to produce a reaction product gas containing trichlorosilane and hydrogen chloride;
   a plurality of heaters that are disposed inside the reaction chamber to heat the raw gas and that are elongated in the vertical direction; and
   a plurality of electrodes connected to basal portions of the plurality of heaters,
   wherein the plurality of heaters include first heaters each constituted of a portion defined as a first exothermic portion that generates heat by electrification through the electrodes; and
   second heaters each having a portion defined as a second exothermic portion that is shorter than that of the first heaters and generates heat by electrification through the electrodes, and a radiation plate that is made of a non-exothermic portion and is connected to an upper end or a lower end of the second exothermic portions of the second heaters,
   wherein the first heaters and the second heaters are disposed such that a partial portion of the first exothermic portion of the first heaters faces the radiation plates of the second heaters;
   the reaction chamber has an introducing port of the raw gas on a side to which the second exothermic portions of the second heaters are arranged in positioning relative to the radiation plates of the second heaters; and
   the reaction chamber has a discharge port of the reaction product gas on a side to which the radiation plates of the second heaters is arranged.

2. The apparatus for producing trichlorosilane according to claim 1, wherein the radiation plate is formed to have a length of ¼ to ⅔ of a length of the first exothermic portion of the first heaters.

3. The apparatus for producing trichlorosilane according to claim 1, wherein the plurality of heaters are constituted of a first heater lines constituted only of the first heaters and a second heater line that is interposed between the first heater lines and is partially or totally constituted of the second heaters.

4. The apparatus for producing trichlorosilane according to claim 1, wherein the plurality of heaters are arranged along three or more concentric circles, and the second heater line is disposed in one of the circles except for the inner most circle and the outermost circle.

5. The apparatus for producing trichlorosilane according to claim 1, wherein an introducing port through which the raw gas is introduced into the reaction chamber is disposed in a lower section or a bottom section of the reaction chamber, basal portions of the plurality of heaters at which the plurality of heaters and the plurality of electrodes are connected are disposed in the lower section of the reaction chamber, and the radiation plates of the second heaters and a discharge port through which the reaction product gas is discharged outside the reaction chamber are disposed in an upper section of the reaction chamber.

6. A method for producing trichlorosilane, in which a raw gas containing silicon tetrachloride and hydrogen supplied into a reaction chamber is heated by a plurality of heaters vertically installed in the reaction chamber, wherein each of the plurality of heaters is provided with a first heater including a portion defined as a first exothermic portion that generates heat by electrification of an electrode installed on a basal end of the first heater, and a second heater including a portion defined as a second exothermic portion whose length is shorter than that of the first exothermic portion of the first heater and a radiation plate that is made of a non-exothermic portion which is connected to an upper end or a lower end of the second exothermic portion of the second heater, and wherein the first and the second heaters are disposed such that partial portions of the first exothermic portions of the first heaters faces the radiation plates of the second heaters, the method comprising:
   supplying the raw gas into the reaction chamber through an introducing port positioned closer to the second exothermic portions of the second heaters than the radiation plates;
   heating the raw gas by the first exothermic portions of the first heaters and the second exothermic portions of the second heaters while radiating heat generated by the first exothermic portions of the first heaters via the radiation plates; and
   discharging a reaction product gas containing trichlorosilane from the reaction chamber through a discharge port positioned closer to the radiation plates than the second exothermic portions of the second heaters.

* * * * *